United States Patent
Li et al.

(10) Patent No.: US 9,924,346 B2
(45) Date of Patent: Mar. 20, 2018

(54) CHANGING OF MOBILE COMMUNICATION SYSTEM

(71) Applicant: Telefonaktiebolaget L M Ericsson (publ), Stockholm (SE)

(72) Inventors: Qiang Li, Täby (SE); Justus Petersson, Hässelby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 334 days.

(21) Appl. No.: 14/114,493

(22) PCT Filed: Jun. 28, 2013

(86) PCT No.: PCT/SE2013/050818
§ 371 (c)(1),
(2) Date: Oct. 28, 2013

(87) PCT Pub. No.: WO2014/209187
PCT Pub. Date: Dec. 31, 2014

(65) Prior Publication Data
US 2015/0350880 A1 Dec. 3, 2015

(51) Int. Cl.
| | |
|---|---|
| *H04W 4/00* | (2009.01) |
| *H04W 8/20* | (2009.01) |
| *H04W 36/06* | (2009.01) |
| *H04W 8/18* | (2009.01) |
| *H04L 12/40* | (2006.01) |
| *H04W 60/06* | (2009.01) |

(52) U.S. Cl.
CPC ............ *H04W 8/20* (2013.01); *H04W 8/183* (2013.01); *H04W 36/06* (2013.01); *H04L 2012/40273* (2013.01); *H04W 60/06* (2013.01)

(58) Field of Classification Search
CPC .................. H04W 8/20; H04W 36/06; H04L 2012/40273

(Continued)

(56) References Cited

U.S. PATENT DOCUMENTS

| | | | |
|---|---|---|---|
| 2010/0136967 A1* | 6/2010 | Du | H04W 8/205 455/432.3 |
| 2010/0203906 A1* | 8/2010 | Fang | H04W 68/025 455/458 |

(Continued)

FOREIGN PATENT DOCUMENTS

| | | | | |
|---|---|---|---|---|
| WO | WO-2011057668 | | 5/2011 | |
| WO | WO 2011057668 A1 | * | 5/2011 | ............ H04W 8/26 |
| WO | WO2011057668 A1 | * | 5/2011 | |

OTHER PUBLICATIONS

"Embedded SIM Task Force Requirements and Use Cases", 1.0, GSM Association, Feb. 21, 2011, 38 pages.

(Continued)

*Primary Examiner* — Ricky Ngo
*Assistant Examiner* — Wei-Po Kao
(74) *Attorney, Agent, or Firm* — Nicholson De Vos Webster & Elliott LLP

(57) ABSTRACT

A subscriber identity is changed for a mobile terminal through an instruction being provided to the mobile terminal to detach from a first mobile communication system, to which the first mobile communication system the mobile terminal is attached using a first subscriber identity, where the instruction is also an instruction to change to a second subscriber identity associated with a second mobile communication system. The mobile terminal receives the instruction via the first mobile communication system, detach from the first mobile communication system attaches to the second mobile communication system using the second subscriber identity.

16 Claims, 4 Drawing Sheets

(58) Field of Classification Search
USPC .................................. 370/310–350, 216–228
See application file for complete search history.

(56) References Cited

U.S. PATENT DOCUMENTS

| | | |
|---|---|---|
| 2010/0222104 A1 | 9/2010 | Lee |
| 2011/0149872 A1* | 6/2011 | Carroll .............. H04W 36/0011 370/328 |
| 2011/0217979 A1* | 9/2011 | Nas ......................... H04W 4/00 455/433 |
| 2015/0319603 A1* | 11/2015 | Faller ...................... H04W 8/00 455/432.1 |

OTHER PUBLICATIONS

"Smart Cards; Embedded UICC; Requirements Specification", Draft ETSI TS 103 383 V<0.0.6> (May 2011), 20 pages.
International Searching Authority, Application No. PCT/SE2013/050818, dated Apr. 11, 2014, 1 page.
International Search Report, Application No. PCT/SE2013/050818, dated Apr. 11, 2014, 5 pages.
Written Opinion of International Searching Authority, Application No. PCT/SE2013/050818, dated Apr. 11, 2014, 9 pages.
"3rd Generation Partnership Project; Technical Specification Group Core Network and Terminals; Evolved Packet System (EPS); Mobility Management Entity (MME) and Serving GPRS Support Node (SGSN) related interfaces based on Diameter protocol (Release 9)", 3GPP TS 29.272 V9.10.0 (Mar. 2012), 92 pages.
"3rd Generation Partnership Project; Technical Specification Group Services and System Aspects; Feasibility study on the security aspects of remote provisioning and change of subscription for Machine to Machine (M2M) equipment (Release 9)", 3GPP TR 33.812 V9.2.0 (Jun. 2010), 87 pages.
Decision to grant a European patent pursuant to Article 97(1) EPC for Application No. 13740389.5, dated Mar. 23, 2017, 2 pages.
International Preliminary Report on Patentability for Application No. PCT/SE2013/050818, dated Jun. 18, 2015, 10 pages.

* cited by examiner

CHANGING OF MOBILE COMMUNICATION SYSTEM

CROSS-REFERENCE TO RELATED APPLICATIONS

This application is a National stage of International Application No. PCT/SE2013/050818, filed Jun. 28, 2013, which are hereby incorporated by reference.

TECHNICAL FIELD

The invention relates to mobile communication systems. More particularly, the invention relates to a subscriber identity changing arrangement for at least one mobile communication system and a method for changing mobile communication system, a mobile terminal for communication with at least one mobile communication system and a method of changing communication from a first mobile communication system to a second mobile communication system.

BACKGROUND

Mobile communication systems where mobile terminals, often termed user equipment, communicate wirelessly have become more and more popular.

Mobile communication systems, such as public land mobile systems are operated by Operators. There may in geographical areas, such as in a country, exist a number of different operators.

At the same time it is today not uncommon that mobile terminals are involved in data communication without user involvement, often referred to as machine—machine communication. A mobile terminal may thus be provided in a machine, such as a car and communicate with other machines via the mobile communication system.

The mobile terminal may in this case also be owned by a company. Such a company may not want the mobile terminal to be too tightly linked to a specific operator, but may want to change operator or at least have the option of such a change of operator.

Various access rights for the mobile terminal to a mobile communication system is often related to a subscription and a subscriber identity, such as an International Mobile Subscriber Identity (IMSI). The handling of such a subscription on behalf of the mobile terminal is then often carried out with the use of a smart card such as a Subscriber Identity Module (SIM) a Universal Integrated Circuit Card (UICC) or an embedded UICC (eUICC).

In order to change from a first mobile communication system to a second mobile communication system the following steps may have to be performed:
1. The smart card downloads, using the radio circuit of the mobile terminal and the access network of the first mobile communication system, a new subscription remotely from a subscription manager
2. The subscription manager sends a mobile terminated SMS (SMS-MT) to the smart card to enable the new subscription
3. The smart card enables the new subscription, disables old subscription, and switches to the subscription
4. The smart card triggers the mobile terminal to reset
5. the mobile terminal resets and
6. the mobile terminal re-connects to the network with the new subscription using a new IMSI.

Steps 3-5 are often termed "Enabling Subscription Process". As can be seen the mobile terminal has to be reset in order to switch (attach) to the new system. The "Enabling Subscription Process" takes at least 30 seconds to complete with reset of the mobile terminal. Thereafter it takes several seconds to attach to the new mobile communication system with the new subscription. The delay is too long if there is real-time traffic going on with the mobile terminal or if the mobile terminal is not delay-tolerant, and the major reason for the delay is that the mobile terminal needs to reset to switch and attach to the new network.

The delay may for instance be problematic if the mobile terminal is involved in an activity that requires fast communication or if it needs to have the option to issue hazard warnings. Such a delay may thus be unacceptable.

There is therefore a need for an improvement when changing from one subscription to another. There is in a particularly a need for a change of subscription that is considerable faster than the one described above.

SUMMARY

One object is thus to provide an improvement in the change from a first mobile communication system to a second mobile communication system.

This object is according to a first aspect of the invention achieved by a subscriber identity changing arrangement for at least one mobile communication system. The arrangement comprises a processor and memory. The memory contains computer instructions executable by the processor whereby the subscriber identity changing arrangement is operative to: provide an instruction to a mobile terminal to detach from a first mobile communication system, to which the mobile terminal is attached using a first subscriber identity. The instruction is also an instruction to change to a second subscriber identity associated with a second mobile communication system.

This object is according to a second aspect also achieved by a method for changing mobile communication system a mobile terminal is to communicate with. The method is performed in a subscriber identity changing arrangement and comprises:
providing an instruction to the mobile terminal to detach from a first mobile communication system, to which the mobile terminal is attached using a first subscriber identity. The instruction is also an instruction to change to a second subscriber identity associated with a second mobile communication system.

The object is according to a third aspect of the invention also achieved through a mobile terminal for communication with at least one mobile communication system. The mobile terminal comprises a radio circuit that is configured to:
receive via a first mobile communication system to which the mobile terminal is attached using a first subscriber identity, an instruction from a subscriber identity changing arrangement to detach from the first mobile communication system, where the instruction is also an instruction to change to a second subscriber identity associated with a second mobile communication system, and
attach to the second mobile communication system using the second subscriber identity.

The object is according to a fourth aspect furthermore achieved by a method of changing communication from a first mobile communication system to a second mobile communication system. The method is performed in a mobile terminal and comprises
receiving, via a first mobile communication system to which the mobile terminal entity is attached using a first subscriber identity, an instruction from a subscriber identity changing arrangement to detach from the first mobile communication system, where the instruction is also an instruction to change to a second subscriber identity associated with a second mobile communication system, and attaching to the second mobile communication system using the second subscriber identity.

The invention according to the above-mentioned aspects has a number of advantages. The detachment from the first mobile communication system and the attachment to the second mobile communication system is all handled through the use of these mobile communication systems. The mobile terminal may thereby always be on and do not need to be reset. This allows a swift change, without unnecessary loss of data. The change over is also simple in that no manual operation of the mobile terminal is required.

BRIEF DESCRIPTION OF THE DRAWINGS

The invention will now be described in more detail in relation to the enclosed drawings, in which.

DETAILED DESCRIPTION

In the following description, for purposes of explanation and not limitation, specific details are set forth such as particular architectures, interfaces, techniques, etc. in order to provide a thorough understanding of the invention. However, it will be apparent to those skilled in the art that the invention may be practiced in other embodiments that depart from these specific details. In other instances, detailed descriptions of well-known devices, circuits and methods are omitted so as not to obscure the description of the invention with unnecessary detail.

Figure 1:
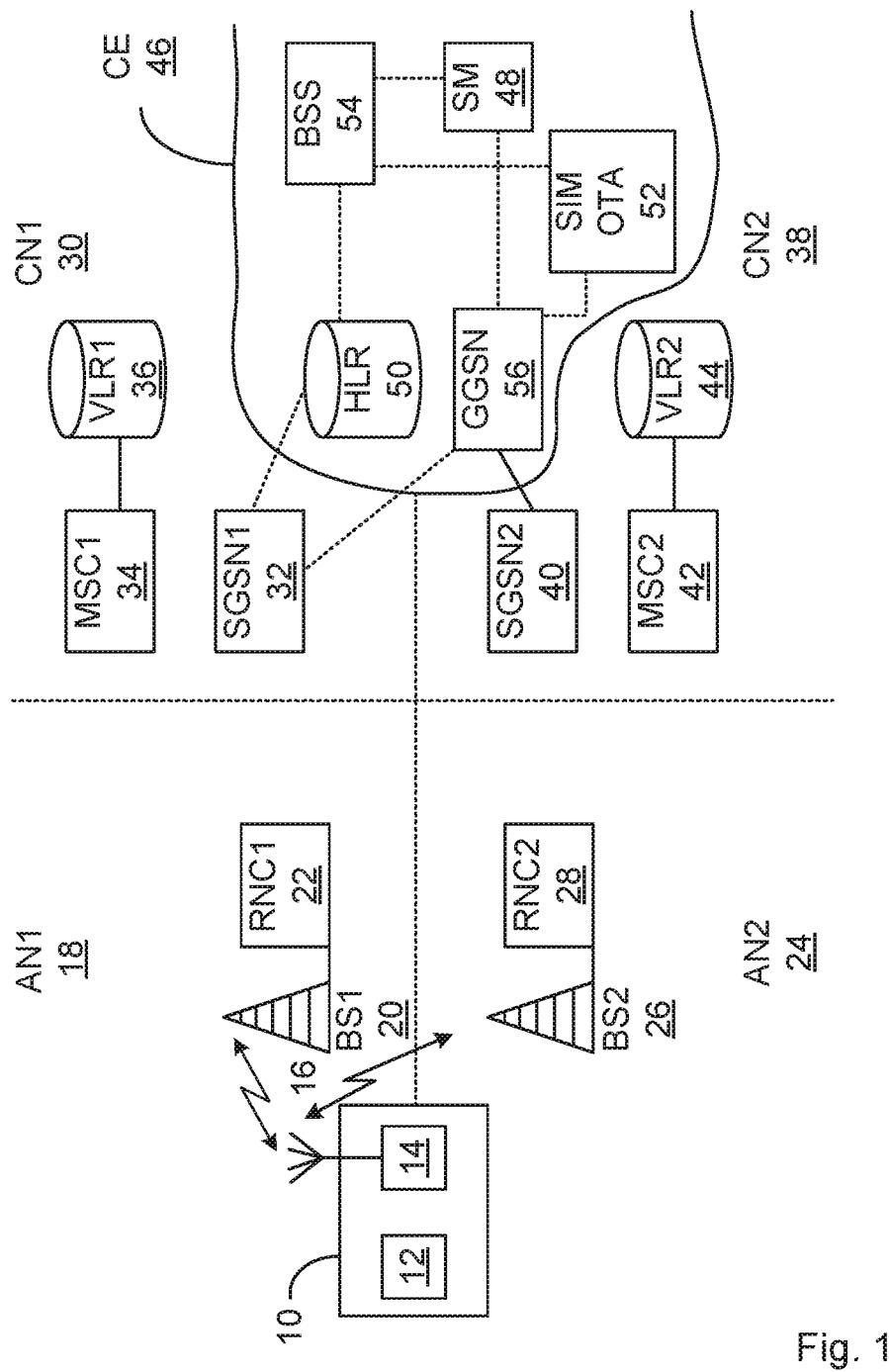
FIG. 1 schematically shows a mobile terminal in contact with two mobile communication systems, where each mobile communication system is divided into an access network and a core network.

In FIG. 1 there is shown a mobile terminal 10 communicating with a first and a second mobile communication system, where each mobile communication system comprises an access network AN1 18 and AN2 24 and a core network CN1 30 and CN2 38.

The mobile terminal comprises a memory module 12 and a radio circuit 14 connected to an antenna 16 in order to communicate with a first base station BS1 20 as well as with a second base station BS2 26. The first base station BS1 20 is a part of the first access network 18 that in turn is associated with a first operator, while the second base station BS2 26 is a part of the second access network AN2 24 that in turn is associated with a second operator.

The first base station 20 is connected to a first radio network controller RNC1 22, while the second base station 26 is connected to a second radio network controller RNC2 28. The first base station 20 and first radio network controller 22 are thus provided in the first access network 18 of the first mobile communication system, while the second base station 26 and second radio network controller 28 are provided in the second access network 24 of the second mobile communication system. In order to simplify the description given of aspects of the invention, these are the only elements of the two access networks being disclosed and described here. It should however be realized that each access network may comprise several more base stations and several more radio network controllers. It should also be realize that in some mobile communication systems there may be no radio network controllers. In this case the access networks may only comprise base stations. Base stations may also be referred to as nodeBs or evolved nodeBs (eNodeB). An access network may also be provided without radio network controller. It may thus solely consist of base stations.

The radio network controller 22 of the first access network 18 communicates with a first core network CN1 30. In this first core network 30 there is a first serving GPRS support node SGSN1 32, where GPRS is an acronym for General Packet Radio Service. There is also a first mobile switching centre MSC1 34 connected to a first visitor location register VLR1 36.

In a similar manner the radio network controller 28 of the second access network 24 communicates with a second core network CN2 38. In this second core network there is a second serving GPRS support node SGSN2 40. There is also a second mobile switching centre MSC2 42 connected to a second visitor location register VLR2 44.

In the core networks there are also a number of further entities. In aspects of the invention these are shared by both the core networks. In both the core networks there is thus a common Home Location Register HLR 50, a common Gateway GPRS Support Node GGSN 56, which are communicating with a business support system BSS 54, a subscription manager SM 48 and a SIM OTA 52. SIM is an acronym of Subscriber Identity Module, which is a type of memory module used in many mobile communication applications. OTA is an acronym of over-the-air. SIM OTA 52 is a unit for remotely programming removable memory modules of mobile terminals over the air. These units are often provided in each core network, but is in some embodiments of the invention a group of common entities 46. They are thus shared by both core networks. This could for instance be the case if the core network functionality of both operators are provided by the same service provider, a core network service provider.

Figure 2:
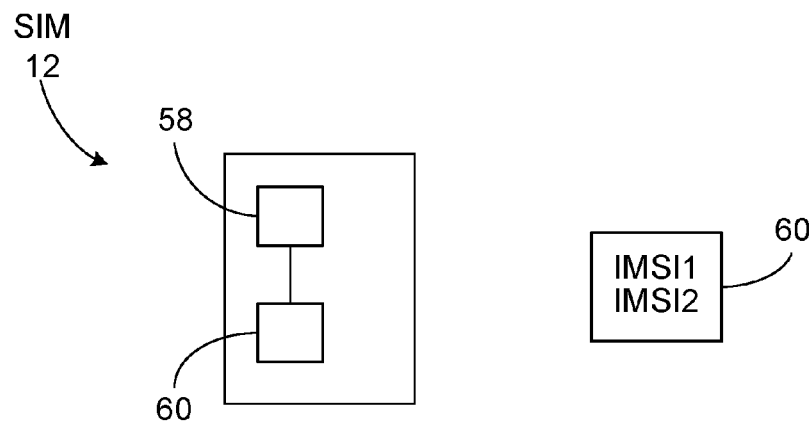
FIG. 2 shows a block schematic of a smart card in the mobile terminal and two subscriber identities on a memory of the smart card.

FIG. 2 schematically shows the memory module 12 of the mobile terminal, which may be a removable memory module. The memory module of the mobile terminal may be a SIM card. In embodiments of the invention a so-called smart card and therefore comprises a processor 58 with connected program memory 60. The smart card may for instance be a Universal Integrated Ciruict Card (UICC) or an embedded Universal Integrated Circuit card (eUICC). In the memory module 60 there are stored two different subscriber identities, each in the form of an international subscriber identity (IMSI). There is a first subscriber identity IMSI1 and a second subscriber identity IMSI2. The first subscriber identity IMSI1 is associated with the first mobile communication system, while the second subscriber identity IMSI2 is associated with the second mobile communication system. In some embodiments the memory module 60 also comprises computer program code for performing some of the functions of the mobile terminal for changing between the two mobile communication systems. In other embodiments the radio circuit comprises such computer program code. In yet other embodiments both the smart card 12 and the radio circuit 14 comprises such functions.

Figure 3:
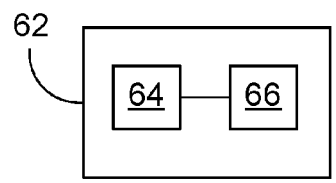
FIG. 3 shows a block schematic of an exemplifying subscription identity changing arrangement comprising a processor and a memory.

FIG. 3 shows a block schematic of one variation of the subscriber identity changing arrangement provided for the two core networks. The arrangement 62 is provided in the form of a server or computer and likewise comprises a processor 64 with associated program memory 66.

Figure 4:
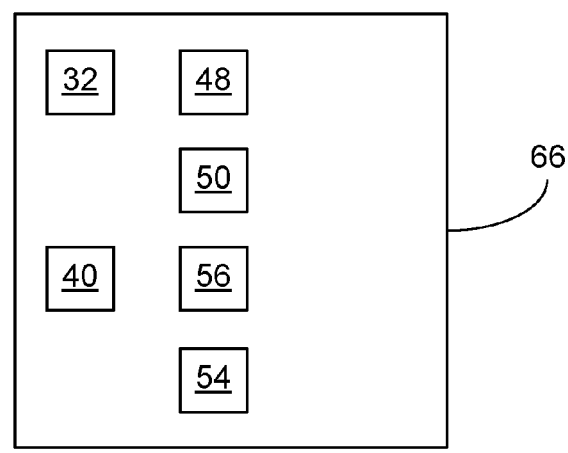
FIG. 4 shows a block schematic of the content of the memory of the arrangement of FIG. 3 with a number of functional blocks.

FIG. 4 shows a block schematic of the memory comprising a number of program modules. In the memory there is a first SGSN module 32, SGSN1, and a second SGSN2 module 40, SGSN2. There is further a subscriber manager module 48, an HLR module 50, a SIM OTA module 52, a BSS module 54 and a GGSN module 56. It can thus be seen that the memory comprises modules for forming the functions of both core networks and particularly for forming common entities. It should be realized that in some embodiments the memory only comprises a HLR module. In other variations it only comprises an HLR module and the SM module. In yet other variations it only comprises an HLR module and the SIM OTA module. It is in all of these variations possible that also the GGSN module is included and/or that the BSS module is included and/or that the SGSN modules are included. It is furthermore possible that also SGSN1 is included.

The MSCs are typically provided as separate entities that are not part of the arrangement. However, they may in some embodiments also be included in the arrangement.

It should here be realized that the modules may be provided in several different computers communicating with each other. It is also possible that one or more of such computers comprises more than one module.

Figure 5:
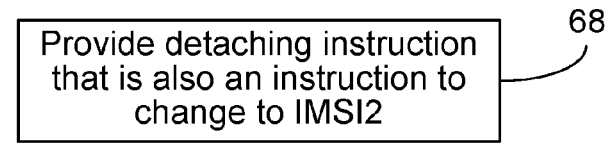
FIG. 5 shows a flow chart of a number of method steps being performed in the subscription identity changing arrangement according to a first embodiment.
Figure 6:
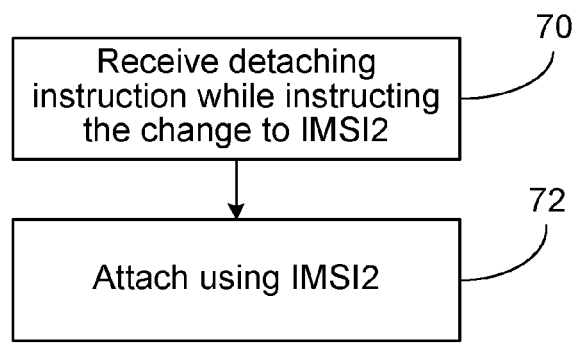
FIG. 6 shows a flow chart of number of corresponding method steps of the first embodiment being performed in the mobile terminal.

Now a first embodiment will be described with reference being made to the previously mentioned FIG. 1-4 as well as to FIG. 5, which shows a flow chart of a number of method steps being performed in the arrangement, and to FIG. 6, which shows a flow chart of number of corresponding method steps being performed in the mobile terminal.

In the following the mobile terminal 10 will be described as communicating with the core networks. In all these cases the communication will be performed using the corresponding access networks. However, this will in the following be omitted in order to provide a clearer description of the various embodiments.

As is known in the art a mobile terminal needs to have a subscription or at least a subscriber identity in order to be allowed communication in a mobile communication system. The subscriber identity may for instance be used in identifying various access rights provided for the user in the mobile communication system.

The mobile terminal has received both the subscriber identities IMSI1 and IMSI2 before the method steps being described in the steps below are being carried out. Both subscriber identities are thus already provided locally in the mobile terminal, for instance being stored in the memory 60 of the smart card 12. One of the IMSIs, and in this example IMSI1 is furthermore active and being used by the mobile terminal for communicating with the corresponding mobile communication system. The other is passive and not yet in use.

It is now assumed that the user, which in this case may be a company having a number of mobile terminals in various applications, selects that a change is to be made from the first mobile communication system to the second mobile communication system. The user may for instance provide instructions to the BSS 54 about a change from the first mobile communication system to the second mobile communication system. This change will then involve a switch from using the first subscriber identity IMSI1 to using the second subscriber identity IMSI2. Therefore the BSS 54 informs a suitable module of the arrangement involved in handling the changeover. This module may be one of the common entities. The module of the arrangement that is involved in handling the changeover may be the HLR 50. In another variation it is handled by SGSN1 32 in the first core network 30. An informing module, which may be HLR or SGSN1 will provide the mobile terminal with an instruction to change from IMSI1 to IMSI 2. The instruction is more particularly an instruction to detach from the first mobile communication system. However the instruction is also, i.e. at the same time, an instruction to change to a second subscriber identity (IMSI2) associated with a second mobile communication system, step 68. In one variation the instruction may be a cancel location message indicating that the subscription associated with the first subscriber identity (IMSI1) has been withdrawn together with an indication that a reattachment is required using the second subscriber identity (IMSI2).

The change may also involve the mobile terminal detaching from the first mobile communication system and attaching to the second mobile communication system. The detaching may essentially be carried out in the first core network, with the role of the mobile terminal essentially only accepting the detaching. The detaching and attaching may be made under the supervision of an attaching control module, which may be the HLR. The instruction to detach may be sent using SGSN1, which would then employ the first access network 18. The attaching control module may further obtain knowledge of the mobile terminal detaching from or accepting the detaching from the first mobile communication system, which may involve obtaining knowledge of the mobile terminal detaching from or accepting detaching from SGSN1. It is possible that the attaching control module is the one sending the instruction, in which case it would not need to get this knowledge. The attaching control module may further obtains knowledge of the mobile station trying to attach to the second mobile communication system based on IMSI2, for instance through the mobile station wanting to attach to SGSN2. This may be obtained through receiving a message either directly or via for instance the associated SGSN of the fact. Thereafter the attaching control module may ensure that the second core network performs an attachment procedure. If the attaching control module is the HLR it may ensure this through proper communication with the SGSN2.

The mobile terminal thus receives the instructions to change from IMSI1 to IMS2, through receiving the instruction to detach from the first mobile communication system, which at the same time is an instruction to change to a second subscriber identity (IMSI2) associated with the second mobile communication system, step 70, which may be received and handled by the radio circuit 14. After receiving the request to detach, the radio circuit may detach or accept the detachment from the first mobile communication system based on the request and also attaches to the second communication network using IMSI2, step 72. The attaching may be performed based on the radio circuit requesting to be attached to the second mobile communication system.

As can be seen from what has been described above the detachment from the first mobile communication system and the attachment to the second mobile communication system is all handled through the use of the core networks. The mobile terminal may thereby always be on and do not need to be reset. This allows a swift change, without unnecessary loss of data. If for instance important messages are to be conveyed to the mobile terminal, it my be able to be aware of these in a completely different way than if having to be turned off or reset. The change over is also simple in that no manual operation of the mobile terminal is required. This also allows an operator change to be made for interrupt-sensitive services, e.g. hazard warning for automotive applications.

Figure 7:
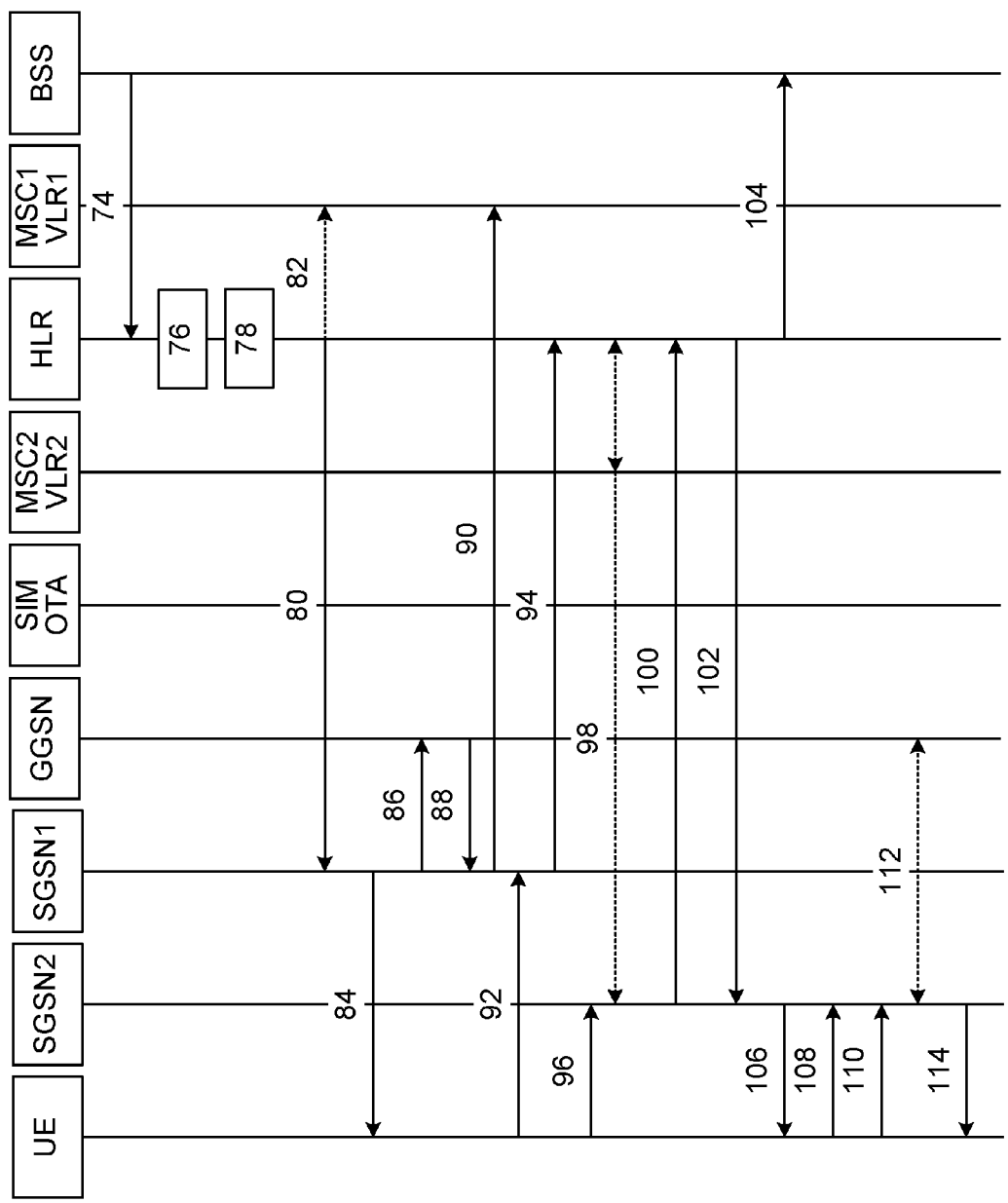
FIG. 7 shows a number of signals being exchanged between the mobile terminal and the two core networks according to a second embodiment.

Now a second embodiment will be described with reference being made to FIG. 1-4, as well as to FIG. 7, which shows a number of signals exchanged between the mobile terminal and the two core networks.

In this embodiment entities of the two core networks (HLR and SGSN) controls the mobile terminal to conduct a detach-reattach process to switch to the second mobile communication system with a new subscription (IMSI2) through the HLR deactivating the old subscription and initiating SGSN1 to start a Detach process to the mobile terminal in order to detach the old subscription (IMSI1) with a new type of detaching request message, i.e. a message requesting the mobile terminal to detach from the first mobile communication system. In this embodiment SGSN1 32 the detach message is of a type "re-attach with new IMSI required". This means that the detach message requesting a mobile station to detach from a core network also specifies that the mobile terminal is to attach to another core network. For this reason the message would also comprise information of the IMSI to be used in the new mobile communication system. The mobile terminal then reattaches with the new subscription (new IMSI2) as required by the network. In this embodiment it is the radio circuit that is in charge of the changing of subscription and therefore comprises subscription changing functionality of the mobile terminal. Furthermore, the informing module may here be the HLR 50, which also acts as an attaching control module. In this embodiment SGSN1 may be an assisting attaching control module and may therefore also be a part of the subscriber identity changing arrangement.

The third embodiment may be carried out in the following way: The BSS 54 initiates the subscription change operation and notifies 74 HLR 50 to trigger a subscription change. HLR 50 then activates 76 the new subscription, i.e. the subscription of IMSI2, and deactivates 78 the old subscription, i.e. the subscription of IMSI1. The activation may involve the associating of IMSI2 to mobile terminal data and phone number and subscription data such as access rights and pricing. This grants the mobile terminal the use of various bearer services in the second mobile communication system such as Short Message Service (SMS), data and voice and allows the mobile terminal to participate in various signaling procedures. The deactivation may involve barring the mobile terminal from using the bearer services, and disallowing the performing of signaling procedures except for retrying to attach.

HLR 50 thereafter initiates a special "Cancel Location" message with cancellation type set as "subscription withdrawn". It is thus a message indicating that the mobile terminal with IMSI1 is not be handled by SGSN1 for the reason that the subscription has been withdrawn. The message therefore comprises "IMSI1" for deactivation of the subscription to the first mobile communication system. However, the message also comprises "IMSI2" perhaps together with an indication that it is to be used for activation in a different mobile communication system than the first mobile communication system. The message 80 is sent to SGSN1 32. It may also be sent 82, perhaps without the indication of location update, to MSC1/VLR1. The HLR 50 thus generates a cancel location message to SGSN1 32 and MSC1/VLR1 34 36 which is a message to change the location in respect of IMSI1. However, it is also an indication that an updated location is to be made in respect of IMSI2.

After having received the message 80, SGSN1 32, which may act as the informing module, then requests 84 the mobile terminal 10 to detach from the first mobile communication system, which request is a request to stop using the mobile communication system of IMSI1. However, the message also comprises an indication that IMSI2 is to be used for obtaining network connectivity with the second mobile communication system. The request to detach 84 may here indicate "re-attach with new IMSI required" and also indicate the "new IMSI number to be used for the reattachment".

As the mobile terminal 10 is connected to the first mobile communication system, there may exist a Packet Data Protocol (PDP) context for the mobile terminal in the first core network 30. This involves a GPRS Tunneling protocol (GTP) tunnel between SGSN1 32 and GGSN 56. The PDP context may comprise an IP address assigned to the mobile terminal in the first mobile communication system, IMSI1, as well as Tunnel Endpoint IDs for GGSN and SGSN1.

In relation to sending the request 84 SGSN1 deactivates and deletes the existing PDP context 86 that it itself has as well as instructs the GGSN 56 to delete the context and when the GGSN 56 also has deleted the PDP context, SGSN1 receives a response 88 that the context has been deleted. SGSN1 also informs MSC1/VLR1 34/36 that there is a detachment through sending a GPRS detach indication 90 to MSC1 in respect of IMSI1. The deactivating and deleting may also involve deleting possible inserted attachment data such as IMSI1, phone number and bearer services, etc.

After having received the request to detach 84 also the radio circuit 14 of the mobile terminal 10 deactivates the PDP context and thereafter accepts the detachment 92 through sending a Detach Accept message to SGSN1. In this way the old subscription (IMSI1) of the mobile terminal 10 is detached from the SGSN1 and MSC1/VLR1.

After having deleted the PDP context and cancelled the location, SGSN1 32 acknowledges the request to cancel location 94 to HLR 50.

After the completion of the detach procedure, the radio circuit 14 of the mobile terminal 10 then initiates an attach procedure with the new IMSI, IMSI2. This initiation is thus triggered by the reception of the special detach request sent by SGSN1 32. After attaching the radio circuit 14 of the mobile terminal 10 should also activate PDP context(s).

Therefore the radio circuit 14 initiates an attach procedure with the new IMSI, iMSI2, through requesting 96 an attachment from the SGSN2 40 based on IMSI2. SGSN2 40 then performs 98 an attachment procedure for the mobile terminal 10 with the HLR 50 using IMSI2. In this procedure the mobile terminal is attached with SGSN2. HLR 50 also attaches the mobile terminal with MSC2/VLR2 42 and 44.

In the attach procedure, SGSN2 40 sends 100 an Update Location request to HLR 50 and HLR 50 inserts subscription data into SGSN2 as well as in MSC2/VLR2 42 and 44. When the HLR is finished with this it sends an acknowledgement Update Location Ack 102 to SGSN2 40.

After having sent the update locations acknowledgement 102, the HLR 50 sends a "change subscription response" 104 to BSS 54, which informs BSS that the subscription of the user has been changed from the first mobile communication system to the second mobile communication system 7 After having received the update locations acknowledgement 102, SGSN2 40 sends an "Attach accept" response 106 to the mobile terminal with IMSI2.

The attach accept is received by the radio circuit 14, which may then send an "Attach complete" message 108 to SGSN2. Also this message may include IMSI2.

The radio circuit 14 of the mobile terminal 10 then sends a PDP context activation request no to SGSN2, whereupon SGSN2 may establish a PDP context 112 with GGSN and may in this regard set up a GPRS Tunneling protocol (GTP) tunnel with GGSN 56. The context may then comprise endpoint identifiers of this tunnel, an IP address assigned to the mobile terminal 10 and of course also IMSI2. SGSN2 then sends back a "PDP context activation response" 114 to the mobile terminal 10, indicating that the PDP context has been set up.

The smart card may then disable the old subscription, i.e. the subscription associated with IMSI1, which may be done through setting a disabled flag associated with the IMSI. At the same time it may enable the new subscription through setting an enable flag associated with IMSI2. In this way it is ensured that only the enabled IMSI is used for future reattachment. As an alternative it is possible that the smart card deletes IMSI1 and only retains IMSI2, It can in this way be seen that the change from the first mobile communication system to the second mobile communication system is made using the two core networks. The mobile terminal is thereby able to switch to the new subscription and new operator network in much shorter delay (about 10 seconds) with network controlled detach-reattach process, comparing to the "Enabling Subscription Process" in the smart card, which takes at least 30 seconds for performing execution and reset. The change is also used without actually having to relying on subscription manager and smart card. A low number of parties need therefore be involved, which simplifies the change.

The activation of a PDP context is dependent on the need for communication of data. It should also be realized that it is possible that the old subscription is not disabled, but retained for possible further use.

It is possible that there are two GGSNs and two HLRs, one in each core network. An SGSN will then communicate with the HLR and GGSN of the own core network. In this case the BSS may act as an informing module that instructs the HLR of the first core network 30 to deactivate the old subscription and instructs the HLR of the second core network 38 to activate the new subscription. In this case the instruction to deactivate the old subscription may comprise an instruction to the HLR of the first core network 30 to send a special detach request with indication that a reattachment with IMSI2 is required.

Figure 8:
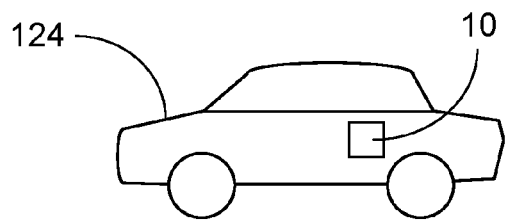
FIG. 8 shows one realization of the mobile terminal when being provided in a vehicle.

The mobile terminal may as an example also be provided in a vehicle, such as a car 124 or a truck. One such realization is shown in FIG. 8.

The notifying module may be considered as being implemented as means for providing an instruction to a mobile terminal to detach from a first mobile communication system, to which first mobile communication system the mobile terminal is attached using a first subscriber identity, said instruction also being an instruction to change to a second subscriber identity associated with a second mobile communication system.

The means for providing an instruction may further be considered to provide means for providing a cancel location message indicating that the subscription associated with the first subscriber identity has been withdrawn together with an indication that a reattachment is required using the second subscriber identity.

The attachment control module may be considered as being implemented as means for initiating an attachment procedure in the second communication system in relation to the second subscriber identity after obtaining knowledge of the mobile terminal attaching to the second mobile communication system based on the second subscriber identity.

The means for initiating an attachment procedure may be considered to comprise means for receiving a request to attach to the second mobile communication system, said request comprising the second subscriber identity.

In a similar manner the radio circuit may be considered to comprise mean for receiving via a first mobile communication system to which the mobile terminal is attached using a first subscriber identity, an instruction from a subscriber identity changing arrangement to detach from the first mobile communication system, said instruction also being an instruction to change to a second subscriber identity associated with a second mobile communication system, and means for attaching to the second mobile communication system using the second subscriber identity, The means for receiving an instruction may furthermore be considered as comprising means for receiving a cancel location message indicating that the subscription associated with the first subscriber identity has been withdrawn together with an indication that a reattachment is required using the second subscriber identity.

The radio circuit may also be considered to comprise means for detaching from the first mobile communication system.

The mobile communication systems are with advantage Wideband Code Division Multiple Access Systems (WCDMA). However, they may as an example also be GPRS systems or Long Term Evolution (LTE) systems.

While the invention has been described in connection with what is presently considered to be most practical and preferred embodiments, it is to be understood that the invention is not to be limited to the disclosed embodiments, but on the contrary, is intended to cover various modifications and equivalent arrangements. Therefore the invention is only to be limited by the following claims.

The invention claimed is:

1. A subscriber identity changing arrangement for at least one mobile communication system, said arrangement comprising:
   a processor; and
   a memory, said memory containing computer instructions executable by said processor whereby said subscriber identity changing arrangement is operative to:
   provide a message, from a first mobile communication system, to a mobile terminal to detach from the first mobile communication system, to which the mobile terminal is attached using a first subscriber identity, the message indicating a second subscriber identity associated with a second mobile communication system that the mobile terminal is to be attached to, and the message also requesting the mobile terminal to change to use the second subscriber identity, wherein the first mobile communication system is different from the second mobile communication system,
obtain a request from the mobile terminal to attach to the second mobile communication system using the second subscriber identity, and
perform an attachment procedure to the second mobile communication system for the mobile terminal, wherein the attachment procedure includes causing a first home location register of the first mobile communication system to deactivate subscription of the mobile terminal to the first mobile communication system and causing a second home location register of the second mobile communication system to activate subscription of the mobile terminal to the second mobile communication system.

2. The subscriber identity changing arrangement according to claim 1, wherein the subscriber identity changing arrangement when providing the message is operative to provide a cancel location message indicating that a subscription associated with the first subscriber identity has been withdrawn together with an indication that a reattachment is required using the second subscriber identity.

3. A method for changing mobile communication system a mobile terminal is to communicate with, the method being performed in a subscriber identity changing arrangement and comprising:
providing, by the subscriber identity changing arrangement including a processor and associated memory, a message, from a first mobile communication system, to the mobile terminal to detach from the first mobile communication system, to which the mobile terminal is attached using a first subscriber identity, the message indicating a second subscriber identity associated with a second mobile communication system that the mobile terminal is to be attached to, and the message also requesting the mobile terminal to change to use the second subscriber identity, wherein the first mobile communication system is different from the second mobile communication system;
obtaining a request from the mobile terminal to attach to the second mobile communication system using the second subscriber identity; and
performing an attachment procedure to the second mobile communication system for the mobile terminal, wherein the attachment procedure includes causing a first home location register of the first mobile communication system to deactivate subscription of the mobile terminal to the first mobile communication system and causing a second home location register of the second mobile communication system to activate subscription of the mobile terminal to the second mobile communication system.

4. The method according to claim 3, wherein the message is provided in a cancel location message indicating that a subscription associated with the first subscriber identity has been withdrawn together with an indication that a reattachment is required using the second subscriber identity.

5. The method according to claim 3, wherein the message causing the mobile terminal to detach from the first mobile communication system and attach to the second mobile communication system performs:
associating the second subscriber identity to phone number of the mobile terminal and subscription data.

6. The method according to claim 3, wherein the message causing the mobile terminal to detach from the first mobile communication system and attach to the second mobile communication system performs:
setting up a packet data protocol (PDP) context for the mobile terminal in the second mobile communication system.

7. A mobile terminal for communication with at least one mobile communication system, said mobile terminal comprising:
a radio circuit being configured to:
receive from a first mobile communication system to which the mobile terminal is attached using a first subscriber identity, a message from a subscriber identity changing arrangement to detach from the first mobile communication system, the message indicating a second subscriber identity associated with a second mobile communication system that the mobile terminal is to be attached to, and the message also requesting the mobile terminal to change to use the second subscriber identity, and
attach to the second mobile communication system using the second subscriber identity, wherein the first mobile communication system is different from the second mobile communication system, and wherein the attachment includes receiving an attachment acceptance from the second mobile communication system; and sending an attachment complete message responsive to the attachment acceptance, wherein the attachment complete message includes the second subscriber identity.

8. The mobile terminal according to claim 7, wherein the message is provided in a cancel location message indicating that a subscription associated with the first subscriber identity has been withdrawn together with an indication that a reattachment is required using the second subscriber identity.

9. The mobile terminal according to claim 7, the radio circuit being further configured to detach from the first mobile communication system.

10. The mobile terminal according to claim 7, wherein it is provided in a vehicle.

11. A method of changing communication from a first mobile communication system to a second mobile communication system, the method being performed in a mobile terminal and comprising:
receiving, by the mobile terminal, from a first mobile communication system to which the mobile terminal is attached using a first subscriber identity, a message to detach from the first mobile communication system, the message indicating a second subscriber identity associated with a second mobile communication system that the mobile terminal is to be attached to, and the message also requesting the mobile terminal to change to use the second subscriber identity; and
attaching the mobile terminal to the second mobile communication system using the second subscriber identity, wherein the first mobile communication system is different from the second mobile communication system, and wherein the attaching includes receiving an attachment acceptance from the second mobile communication system; and sending an attachment complete message responsive to the attachment acceptance, wherein the attachment complete message includes the second subscriber identity.

12. The method according to claim 11, wherein the message is provided in a cancel location message indicating that a subscription associated with the first subscriber identity has been withdrawn together with an indication that a reattachment is required using the second subscriber identity.

13. The method according to claim 11, further comprising: detaching from the first mobile communication system.

14. The method according to claim 11, wherein the mobile terminal is provided in a vehicle.

15. The method according to claim 11, further comprising:
   receiving the first and second subscriber identities prior to receiving the message to detach from the first mobile communication system.

16. The method according to claim 11, further comprising:
   deactivating a packet data protocol (PDP) context for the mobile terminal in the first mobile communication system upon receiving the message to detach from the first mobile communication system.

* * * * *